United States Patent
Ebido et al.

(10) Patent No.: US 10,365,357 B2
(45) Date of Patent: Jul. 30, 2019

(54) LOCATION ESTIMATION METHOD AND APPARATUS USING ACCESS POINT IN WIRELESS COMMUNICATION SYSTEM

(71) Applicant: Samsung Electronics Co., Ltd, Suwon-si (KR)

(72) Inventors: Timothy John Ebido, Suwon-si (KR); Jinseub Eum, Suwon-si (KR); Jinwoo Yang, Suwon-si (KR); Chulhoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/085,928

(22) PCT Filed: Mar. 10, 2017

(86) PCT No.: PCT/KR2017/002620
§ 371 (c)(1),
(2) Date: Sep. 17, 2018

(87) PCT Pub. No.: WO2017/160026
PCT Pub. Date: Sep. 21, 2017

(65) Prior Publication Data
US 2019/0101632 A1    Apr. 4, 2019

(30) Foreign Application Priority Data
Mar. 17, 2016 (KR) .................. 10-2016-0032163

(51) Int. Cl.
| G01S 11/00 | (2006.01) |
| G01S 11/06 | (2006.01) |
| H04W 24/10 | (2009.01) |
| H04W 64/00 | (2009.01) |
| H04B 17/318 | (2015.01) |
| G01S 5/00 | (2006.01) |
| G01S 5/02 | (2010.01) |

(Continued)

(52) U.S. Cl.
CPC ............. *G01S 11/06* (2013.01); *G01S 5/0036* (2013.01); *G01S 5/0252* (2013.01); *G01S 5/14* (2013.01);

(Continued)

(58) Field of Classification Search
CPC ...... G01S 11/06; G01S 5/0036; G01S 5/0252; G01S 5/14; H04B 17/318; H04W 16/20; H04W 24/10; H04W 64/003; H04W 84/12
See application file for complete search history.

(56) References Cited

U.S. PATENT DOCUMENTS

| 2011/0103360 A1* | 5/2011 | Ku | ........................ G01S 5/0252 370/338 |
| 2013/0003572 A1* | 1/2013 | Kim | ..................... H04W 64/00 370/252 |

(Continued)

FOREIGN PATENT DOCUMENTS

| CN | 104931987 A | * 9/2015 |
| JP | 2007329786 A | 12/2007 |

(Continued)

OTHER PUBLICATIONS

Extended European Search Report regarding Application No. 17766927.2, dated Nov. 30, 2018, 8 pages.

(Continued)

*Primary Examiner* — Khai M Nguyen (57) ABSTRACT

An operating method for a location estimation apparatus communicating with an access point (AP) in a wireless communication system according to an embodiment of the present invention comprises the steps of: receiving, from a second AP, a first received signal strength indicator (RSSI) signal having been measured at a first AP, and generating a first RSSI vector corresponding to the first RSSI signal; calculating a path loss exponent, using the distance between (Continued)

the first AP and the second AP and the first RSSI vector, and generating a second RSSI vector of each of multiple sub-areas divided from an entire area, using the path loss exponent; and generating a radio map of the entire area, using the first RSSI vector and the second RSSI vector.

15 Claims, 11 Drawing Sheets

(51) Int. Cl.
    *H04W 16/20* (2009.01)
    *G01S 5/14* (2006.01)
    *H04W 84/12* (2009.01)

(52) U.S. Cl.
    CPC .......... *H04B 17/318* (2015.01); *H04W 16/20* (2013.01); *H04W 24/10* (2013.01); *H04W 64/003* (2013.01); *H04W 84/12* (2013.01)

(56) References Cited

U.S. PATENT DOCUMENTS

2013/0260771 A1* 10/2013 Wirola ................. G01S 5/0252
    455/446
2013/0267257 A1    10/2013  Palanki et al.
2013/0279349 A1    10/2013  Pandey et al.
2014/0011518 A1* 1/2014 Valaee ................. H04W 64/00
    455/456.1
2017/0156027 A1* 6/2017 Peng .................... H04B 17/318

FOREIGN PATENT DOCUMENTS

| | | |
|---|---|---|
| KR | 10-2009-0089044 A | 8/2009 |
| KR | 10-0994840 B1 | 11/2010 |
| KR | 10-2015-0035745 A | 4/2015 |
| WO | 2012095922 A1 | 7/2012 |
| WO | 2015/184961 A1 | 12/2015 |

OTHER PUBLICATIONS

International Search Report dated May 15, 2017 in connection with International Patent Application No. PCT/KR2017/002620.

Written Opinion of the International Searching Authority dated May 15, 2017 in connection with International Patent Application No. PCT/KR2017/002620.

Paramvir Bahl et al., "RADAR: An In-Building RF-based User Location and Tracking System", IEEE INFOCOM, 2000, p. 775-784.

\* cited by examiner

LOCATION ESTIMATION METHOD AND APPARATUS USING ACCESS POINT IN WIRELESS COMMUNICATION SYSTEM

CROSS-REFERENCE TO RELATED APPLICATIONS AND CLAIM OF PRIORITY

This application is a 371 of International Application No. PCT/KR2017/002620 filed Mar. 10, 2017, which claims priority to Korean Patent Application No. 10-2016-0032163 filed on Mar. 17, 2016, the disclosures of which are herein incorporated by reference in their entirety.

BACKGROUND

1. Field

The present invention relates to a method and apparatus for location estimation using an access point in a wireless communication system and, more particularly, to a method and apparatus for readily collecting RF characteristics of indoor locations and estimating the location of a wireless device based on the RF characteristics.

2. Description of Related Art

Existing location tracking techniques utilizing the strength of a WLAN signal of a nearby access point (AP) are widely known. Location tracking techniques using WLAN signal strengths can be classified into indoor location tracking techniques and outdoor location tracking techniques.

In the indoor tracking technique, a WLAN AP is installed in an area to be tracked, and the location of a user having a wireless device is tracked in real time through algorithms such as fingerprinting or triangulation. The indoor tracking technique may use server-based location tracking because the wireless device can access the WLAN AP directly. That is, the wireless device uploads information on the WLAN signal strength of the nearby AP to the location tracking server, and the location tracking server notifies the wireless device of the estimated location calculated through a location tracking algorithm.

The location tracking server may collect radio frequency (RF) characteristics for a specific indoor location based on the strength of the WLAN signal of the nearby AP, and estimate the optimal indoor location of the wireless device in consideration of the RF characteristics.

However, it may take a lot of time for the location tracking server to collect RF characteristics for specific indoor locations, and there may be temporal or physical limitations for the wireless device to measure the WLAN signal strength for specific indoor locations. In addition, whenever the characteristics of the WLAN signal strength change, the RF characteristics for a specific indoor location also change. Hence, it may be difficult for the location tracking server to immediately reflect the changing RF characteristics.

SUMMARY

Accordingly, an aspect of the present invention is to provide a location estimation method and apparatus that can readily collect RF characteristics of indoor locations, generate a radio map for the indoor locations based on the RF characteristics, and estimate the location of a wireless device using the radio map.

In accordance with an aspect of the present invention, there is provided a method of operation for a location estimation apparatus communicating with an access point (AP) in a wireless communication system. The method may include: receiving a first received signal strength indicator (RSSI) signal measured at a first AP via a second AP, and generating a first RSSI vector corresponding to the first RSSI signal; calculating a path loss exponent using the distance between the first AP and the second AP and the first RSSI vector, and generating a second RSSI vector for each of multiple sub-regions constituting the entire region based on the path loss exponent; and generating a radio map for the entire region based on the first RSSI vector and the second RSSI vector.

The location estimation apparatus may be one of an AP controller and an AP server for controlling the APs.

The method may further include: generating a third RSSI vector corresponding to a second RSSI signal measured by a wireless device; and estimating the location of the wireless device in the radio map based on the cosine similarity between the second RSSI vector and the third RSSI vector.

Estimating the location of the wireless device may include: calculating the cosine similarity between the second RSSI vector and the third RSSI vector, and selecting a sub-region having the largest cosine similarity from among the sub-regions; and estimating that the wireless device is located where the selected sub-region is located in the radio map.

The cosine similarity may be calculated for first sub-regions located within a preset distance from the second AP among the sub-regions.

Generating a second RSSI vector for each sub-region may include generating the second RSSI vector by adding an offset calculated using Equation 1 to the first RSSI vector, $$x = n\log\frac{d(C_0, AP_i)}{d(C_1, AP_i)} \quad \text{[Equation 1]}$$

where x is the offset, n is the path loss exponent, C0 is the initial sub-region, C1 is the target sub-region, APi is the second AP, d(C0,APi) is the distance between the initial sub-region and the second AP, and d(C1,APi) is the distance between the target sub-region and the second AP.

The method may further include: normalizing the first RSSI vector and storing the normalized first RSSI vector in the radio map; and normalizing the second RSSI vector and storing the normalized second RSSI vector in the radio map.

The first AP and the second AP may be adjacent to each other. The first RSSI signal may be transmitted from the first AP to the second AP.

In accordance with another aspect of the present invention, there is provided a location estimation apparatus communicating with an access point (AP) in a wireless communication system. The location estimation apparatus may include: a transceiver unit configured to receive a first received signal strength indicator (RSSI) signal measured at a first AP via a second AP; and a radio map generator configured to generate a first RSSI vector corresponding to the first RSSI signal, calculate a path loss exponent using the distance between the first AP and the second AP and the first RSSI vector, generate a second RSSI vector for each of multiple sub-regions constituting the entire region based on the path loss exponent, and generate a radio map for the entire region based on the first RSSI vector and the second RSSI vector.

In a feature of the present invention, the location estimation method and apparatus using access points can readily collect RF characteristics of indoor locations and generate a radio map for the indoor locations based on the RF characteristics.

In another feature of the present invention, the location estimation method and apparatus using access points can estimate the location of a wireless device flexibly based on the radio map in response to a change in characteristics of the WLAN signal strength.

BRIEF DESCRIPTION OF THE DRAWINGS

A brief description of each drawing is provided to help a more thorough understanding of the drawings recited in the detailed description of the present invention.

DETAILED DESCRIPTION

Hereinafter, preferred embodiments of the present invention are described in detail with reference to the accompanying drawings. The same or similar reference symbols are used throughout the drawings to refer to the same or like parts. Descriptions of well-known functions and constructions may be omitted to avoid obscuring the subject matter of the present invention.

Descriptions of functions and structures well known in the art and not directly related to the present invention may also be omitted for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Figure 1:
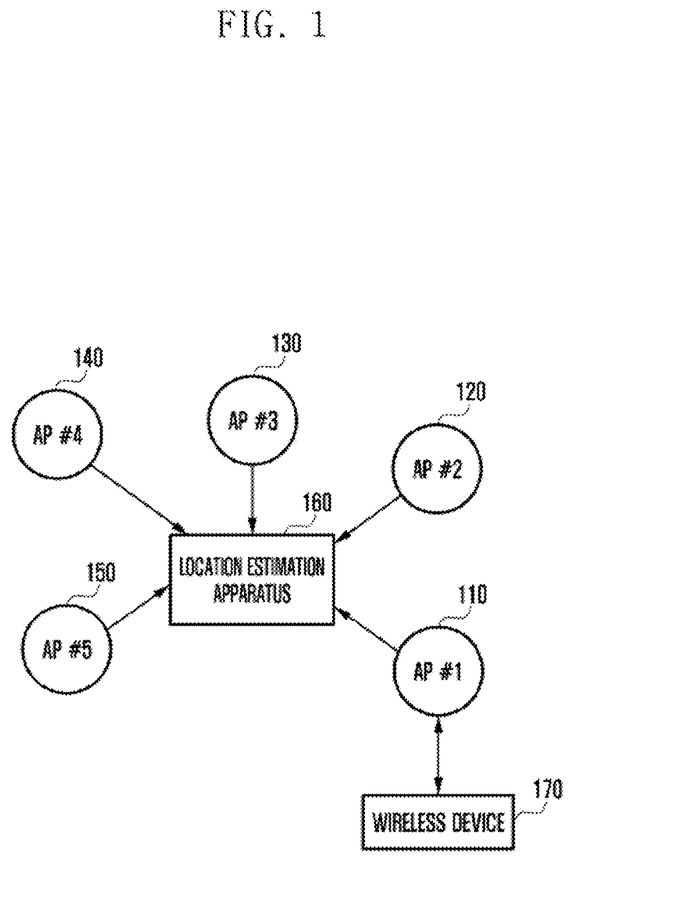
FIG. 1 illustrates a wireless communication system according to an embodiment of the present invention.

FIG. 1 illustrates a wireless communication system according to an embodiment of the present invention.

With reference to FIG. 1, the wireless communication system may include a plurality of access points (APs) 110 to 150, a location estimation apparatus 160 communicating with the access points 110 to 150, and a wireless device 170 connected to at least one of the access points 110 to 150. The access points 110 to 150 are used in a wireless local area network (WLAN) environment.

The location estimation apparatus 160 may be one of an AP controller and an AP server for controlling the access points 110 to 150. In particular, the location estimation apparatus 160 may estimate the location of the wireless device connecting to at least one of the access points 110 to 150 on the basis of received signal strength indicator (RSSI) information of the access points 110 to 150.

The location estimation apparatus 160 may collect AP measurement data from the access points 110 to 150 and generate a radio map for the entire region that can be controlled by the location estimation apparatus 160 on the basis of the AP measurement data. The entire region may be divided into a plurality of sub-regions, and the radio map may include information on each of the sub-regions.

The location estimation apparatus 160 may compare device measurement data received from the wireless device 170 with AP measurement data received from the access points 110 to 150 and estimate that the wireless device 170 is located in one of the plural sub-regions according to the comparison result.

In the present invention, each piece of device measurement data from the wireless device 170 and AP measurement data from the access points 110 to 150 may be generated based on the received signal strength indicator (RSSI) signal. In particular, the RSSI signal may be used for measurement for wireless indoor positioning of the wireless device 170.

Figure 2:
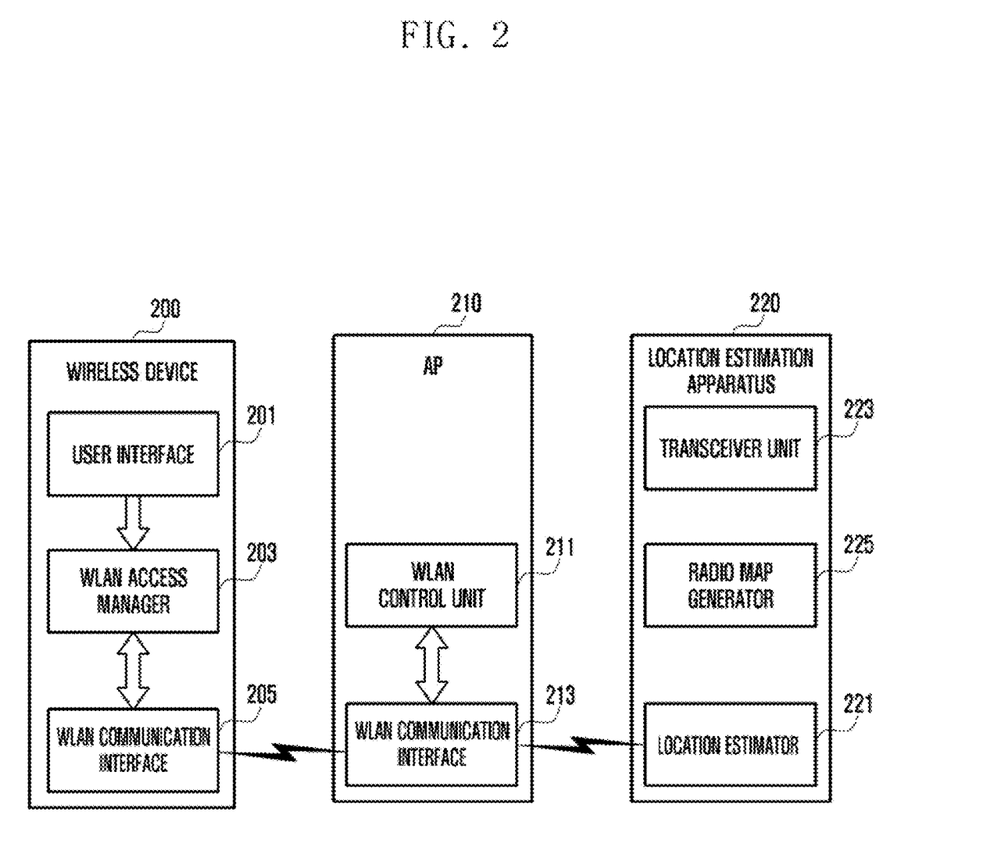
FIG. 2 is a detailed block diagram of devices according to an embodiment of the present invention.

FIG. 2 is a detailed block diagram of devices according to an embodiment of the present invention.

In FIG. 2, the wireless device 200 and the access point (AP) 210 can communicate via their WLAN communication interfaces 205 and 213, and the AP 210 and the location estimation apparatus 220 can communicate via the WLAN communication interface 213 and the transceiver unit 221.

The wireless device 200 may include a user interface 201 and a WLAN access manager 203 in addition to the WLAN communication interface 205.

The user may provide an input for a user's preference or policy (referred to as a policy) as to whether to preferentially access an AP provided by a mobile communication service provider through the user interface 201. The WLAN access manager 203 may receive the user's policy from the user interface 201 and perform WLAN management in consideration of the received policy.

The WLAN control unit 211 of the AP 210 may control the inter-block signal flow for the operation of the AP 210. The WLAN control unit 211 may control the WLAN communication interface 213 to transmit and receive signals to and from the wireless device 200 or the location estimation apparatus 220.

The location estimation apparatus 220 may include a radio map generator 223 and a location estimator 225 in addition to the transceiver unit 221.

The radio map generator 223 may generate a radio map for the entire region that the location estimation apparatus 220 can control on the basis of signals received through the transceiver unit 221 from the AP 210. The entire region may be divided into a plurality of sub-regions, and the radio map generator 223 may generate and store RSSI vector information for each of the sub-regions.

By using signals received via the transceiver unit 221 from the AP 210 and the radio map generated by the radio map generator 223, the location estimator 225 may select a sub-region corresponding to the wireless device (200) from among the plural sub-regions marked in the radio map, and estimate the location of the wireless device 200 based on the location information of the selected sub-region.

Figure 3:
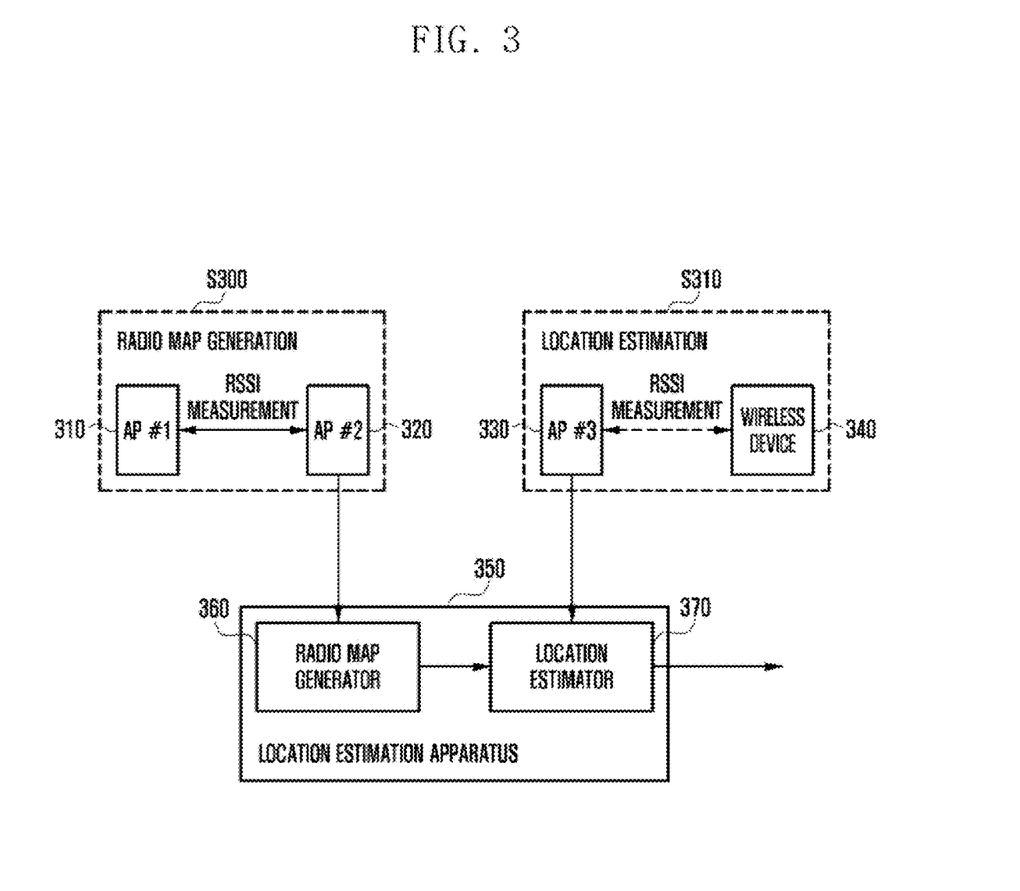
FIG. 3 is a conceptual diagram illustrating the operation of the location estimation apparatus according to an embodiment of the present invention.

FIG. 3 is a conceptual diagram illustrating the operation of the location estimation apparatus according to an embodiment of the present invention.

In one embodiment of the present invention, the operation of the location estimation apparatus 350 communicating with an access point (AP) can be composed of a process of radio map generation (S300) and a process of location estimation (S310).

In the process of radio map generation (S300), the radio map generator 360 of the location estimation apparatus 350 may receive a first RSSI signal measured by the first AP 310 from the second AP 320, and generate a first RSSI vector corresponding to the first RSSI signal. The first AP 310 and the second AP 320 are adjacent to each other, and the first RSSI signal may be transmitted from the first AP 310 to the second AP 320.

The location estimation apparatus 350 may be one of an AP controller and an AP server that controls the APs 310, 320 and 330 according to embodiments.

The radio map generator 360 may calculate a path loss exponent based on the distance between the first AP 310 and the second AP 320 and the first RSSI vector, and may generate a second RSSI vector for each of the plural sub-regions constituting the entire region based on the path loss exponent. That is, in the present invention, the process of generating a vector for a sub-region (e.g., second RSSI vector) based on the basic vector (e.g., first RSSI vector) and the path loss exponent is performed using a path loss algorithm.

The radio map generator 360 may generate a radio map for the entire region using the first RSSI vector and the second RSSI vector. Here, the radio map generator 360 may repeatedly generate the first RSSI vector based on the signals measured by a plurality of APs communicating with the location estimation apparatus 350, and may repeatedly generate the second RSSI vector for each of the sub-regions constituting the entire region based on the first RSSI vector.

The radio map generator 360 may average the repeatedly generated second RSSI vectors and utilize the average second RSSI vector as the representative second RSSI vector. The radio map generator 360 may save the representative second RSSI vector as the vector for the sub-region in the radio map.

In one embodiment, the radio map generator 360 may repeatedly generate the first RSSI vector and the second RSSI vector until completion of the radio map. In another embodiment, the radio map generator 360 may repeatedly generate the first RSSI vector and the second RSSI vector until the target sub-region corresponding to the second RSSI vector is located within a preset distance from the initial sub-region corresponding to the first RSSI vector.

The radio map generator 360 may periodically receive signals from multiple APs communicating with the location estimation apparatus 350 and use the signals to generate vector information for multiple sub-regions included in the radio map, periodically updating the radio map.

The radio map generator 360 may add the offset (e.g., x) calculated using Equation 2 below to the first RSSI vector (e.g., $\{a_i\}$) to obtain the second RSSI vector (e.g., $\{a_i+x\}$).

$$x = n\log\frac{d(C_0, AP_i)}{d(C_1, AP_i)} \qquad \text{[Equation 2]}$$

In Equation 2, x is the offset, n is the path loss exponent, $C_0$ is the initial sub-region, $C_1$ is the target sub-region, $AP_i$ is the second AP (320), $d(C_0, AP_i)$ is the distance between the initial sub-region and the second AP (320), and $d(C_1, AP_i)$ is the distance between the target sub-region and the second AP (320).

The initial sub-region may refer to the sub-region where the first AP 310 is located in the radio map or refer to a specific sub-region in the radio map. The target sub-region refers to the sub-region corresponding to the second RSSI vector for the radio map generator 360 to complete the radio map.

In one embodiment, the radio map generator 360 may normalize the first RSSI vector and store the normalized first RSSI vector in the radio map. The radio map generator 360 may normalize the second RSSI vector and store the normalized second RSSI vector in the radio map.

In the process of location estimation (S310), the location estimator 370 of the location estimation apparatus 350 may generate a third RSSI vector corresponding to the second RSSI signal measured by the wireless device 340. The second RSSI signal may be transmitted from the wireless device 340 to the third AP 330 and then forwarded from the third AP 330 to the location estimator 370.

In one embodiment, the location estimator 370 may repeatedly generate the third RSSI vector in accordance with the second RSSI vector repeatedly generated until completion of radio map generation.

The location estimator 370 may estimate the location of the wireless device 340 in the radio map on the basis of the cosine similarity between the second RSSI vector associated with each of the multiple sub-regions included in the radio map and the third RSSI vector associated with the RSSI signal measured by the wireless device 340.

The cosine similarity is obtained by calculating the cosine of the angle between the two vectors. As the cosine similarity approaches one (1), the angle between the two vectors converges to zero (0). Since the cosine similarity takes into account only the angle between RSSI vectors excluding the RSSI signal strength, in the present invention, it is possible to minimize the power sensitivity difference between the wireless device and the AP.

The location estimator 370 may calculate the cosine similarity between the second RSSI vector and the third RSSI vector, and select a sub-region having the largest cosine similarity from among the plural sub-regions. The location estimator 370 may estimate that the wireless device 340 is located in the selected sub-region within the radio map.

The location estimator 370 may calculate the cosine similarity between the second RSSI vector and the third RSSI vector by using Equation 3 below.

$$\cos\theta = \frac{A \cdot B}{\|A\| \times \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad \text{[Equation 3]}$$

In Equation 3, $A_i$ is the third RSSI vector generated at $i^{th}$ iteration (i: natural number, $1 \leq i \leq n$), $B_i$ is the second RSSI vector generated at $i^{th}$ iteration, and n indicates the number of repetitive generations for the second RSSI vector and the third RSSI vector.

To calculate the cosine similarity, the location estimator 370 may match the dimensions of the second RSSI vector and the third RSSI vector. For example, the location estimator 370 may remove a first AP that is not present in the third RSSI vector but is present in the second RSSI vector, and may insert a small RSSI value into the second RSSI vector for a second AP that is not present in the second RSSI vector but is present in the third RSSI vector.

The location estimator 370 may calculate the cosine similarity between the second RSSI vector and the third RSSI vector for each of all the sub-regions included in the radio map, and find the sub-region having the largest cosine similarity from among all the sub-regions. The location estimator 370 can estimate the sub-region having the largest cosine similarity as a space where the wireless device 340 is located.

In one embodiment, the location estimator 370 may use a weighted average of the locations of the sub-regions included in the radio map. The location estimator 370 may set the position of the sub-region as data and assign the cosine similarity as a weight for the sub-region. In particular, the location estimator 370 may select k sub-regions having the highest weighted average (k: natural number greater than or equal to 1).

The location estimator 370 may calculate the weighted average (P) for the locations of the sub-regions using Equation 4 below.

$$P = \frac{\sum_{i} w_i p_i}{\sum_{i} w_i} \quad \text{[Equation 4]}$$

In Equation 4, P is the weighted average, i indicates one of the plural sub-regions, $w_i$ indicates the cosine similarity corresponding to the sub-region, and $p_i$ denotes the location value (e.g., ($x_i$, $y_i$)) for the sub-region.

The location estimator 370 can reduce the number of sub-regions to be examined when estimating the location of the wireless device 340 by using the weighted average P of the locations of the sub-regions. For example, the location estimator 370 may estimate the location of the wireless device 340 by examining only the sub-regions whose distance from the k sub-regions having the highest weighted average is less than or equal to a value of d.

In one embodiment, the location estimator 370 may calculate the cosine similarity values for the first sub-regions located within a preset distance from the second AP 320 among the plurality of sub-regions, thereby reducing the amount of computation for the cosine similarity.

Figure 4:
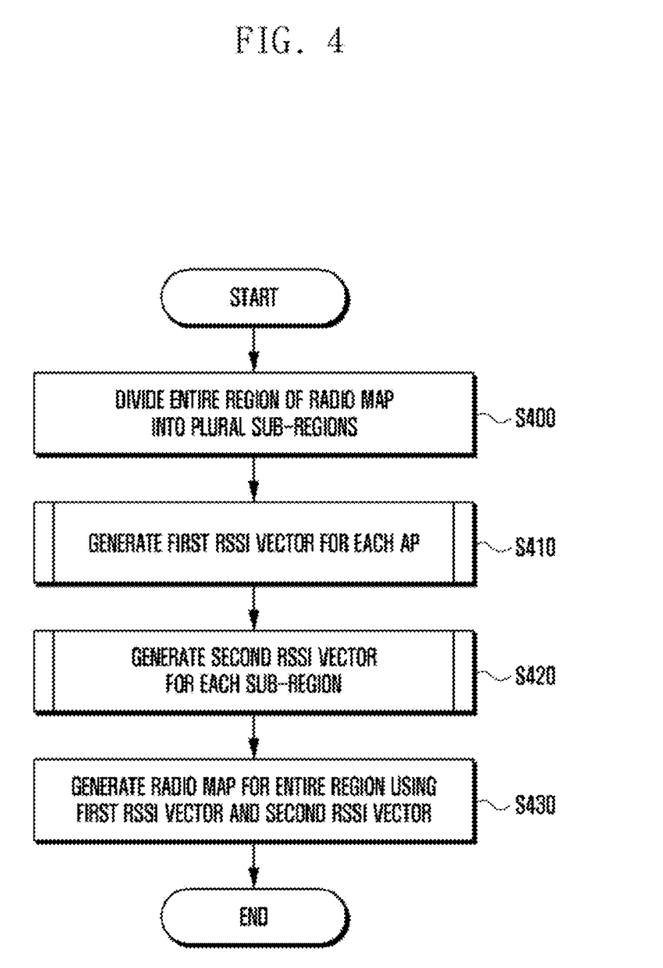
FIG. 4 is a flowchart of a process for the location estimation apparatus to generate a radio map according to an embodiment of the present invention.

FIG. 4 is a flowchart of a process for the location estimation apparatus to generate a radio map according to an embodiment of the present invention.

With reference to FIGS. 1 to 4, the location estimation apparatus may divide the entire region of the radio map into a plurality of sub-regions (S400). The location estimation apparatus may store related information on the sub-regions in the radio map. The related information may include location information (e.g., (x, y)) for each sub-region, and vector information measured at an adjacent AP for each sub-region.

The location estimation apparatus may generate the first RSSI vector for each AP (S410). The location estimation apparatus may receive a first received signal strength indicator (RSSI) signal measured at an adjacent AP from the corresponding AP and generate a first RSSI vector corresponding to the first RSSI signal.

The location estimation apparatus may generate a second RSSI vector for each of the sub-regions (S420). The location estimation apparatus may calculate a path loss exponent based on the distance between the adjacent AP and the corresponding AP and the first RSSI vector, and may generate a second RSSI vector for each of the sub-regions constituting the entire region based on the path loss exponent.

The location estimation apparatus may generate a radio map for the entire region by using the first RSSI vector and the second RSSI vector (S430).

Figure 5:
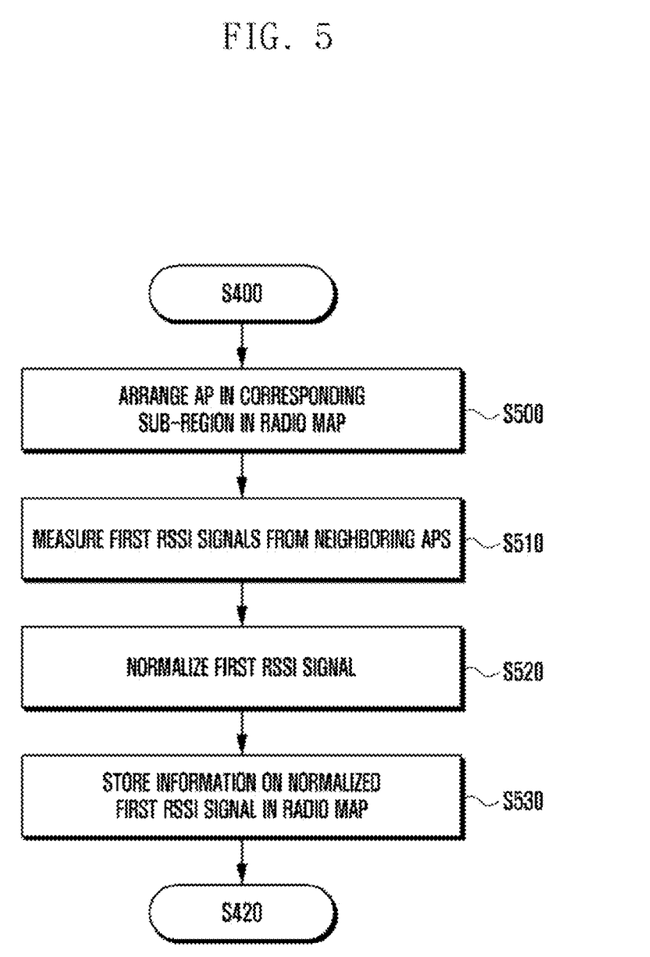
FIG. 5 is a flowchart of an operation for generating the first RSSI vector shown in FIG. 4.

FIG. 5 is a flowchart of an operation for generating the first RSSI vector shown in FIG. 4.

With reference to FIGS. 1 to 5, the location estimation apparatus can arrange the corresponding AP in a sub-region in the radio map (S500). That is, the location estimation apparatus can arrange the corresponding AP in the sub-region corresponding to the place where the corresponding AP is located.

The location estimation apparatus may measure first RSSI signals from those APs neighboring the corresponding AP (S510). The corresponding AP may transmit the first RSSI signals measured from the neighboring APs to the location estimation apparatus.

The location estimation apparatus may normalize the first RSSI signal (S520) and generate the first RSSI vector corresponding to the first RSSI signal based on the normalized first RSSI signal. The location estimation apparatus may store information on the normalized first RSSI signal in the radio map (S530).

Figure 6:
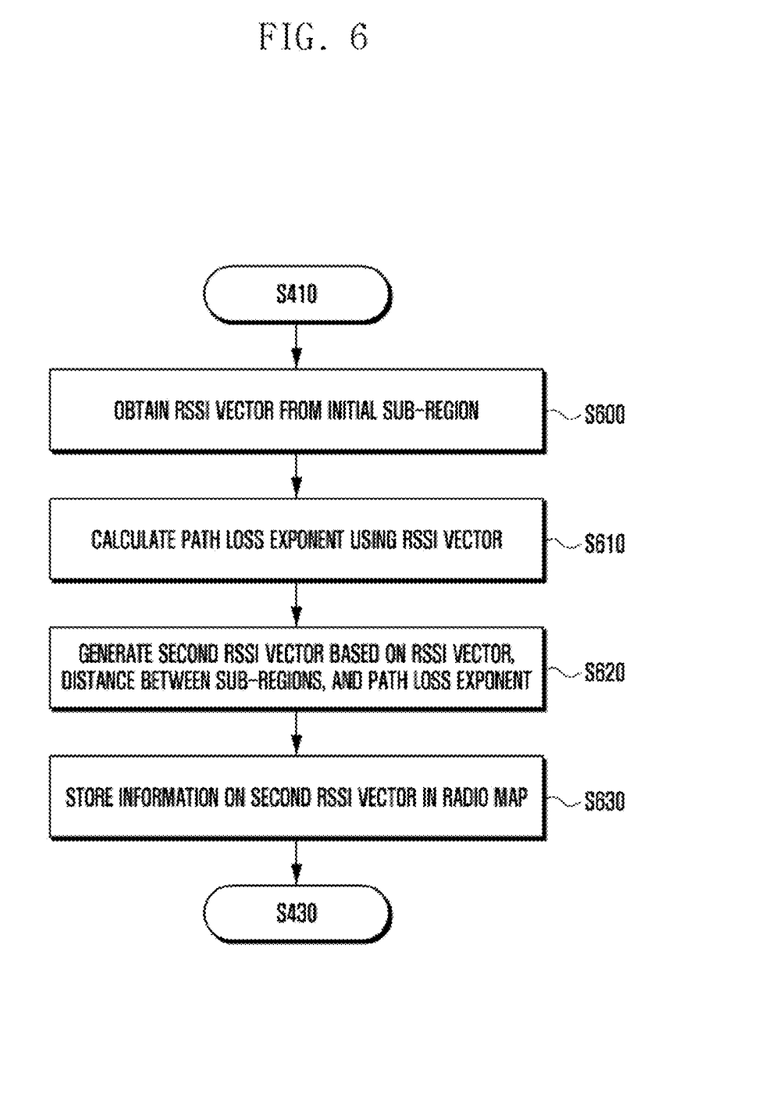
FIG. 6 is a flowchart of an operation for generating the second RSSI vector shown in FIG. 4.

FIG. 6 is a flowchart of an operation for generating the second RSSI vector shown in FIG. 4.

With reference to FIGS. 1 to 6, the location estimation apparatus can obtain the RSSI vector from the initial sub-region (S600). The initial sub-region may refer to the sub-region where an AP collecting RSSI signals is located in the radio map, or refer to a specific sub-region in the radio map.

The location estimation apparatus may calculate the path loss exponent using the RSSI vector (S610). The location estimation apparatus may generate the second RSSI vector based on the RSSI vector, the distance between sub-regions, and the path loss exponent (S620).

The location estimation apparatus may store information on the second RSSI vector in the radio map (S630).

Figure 7:
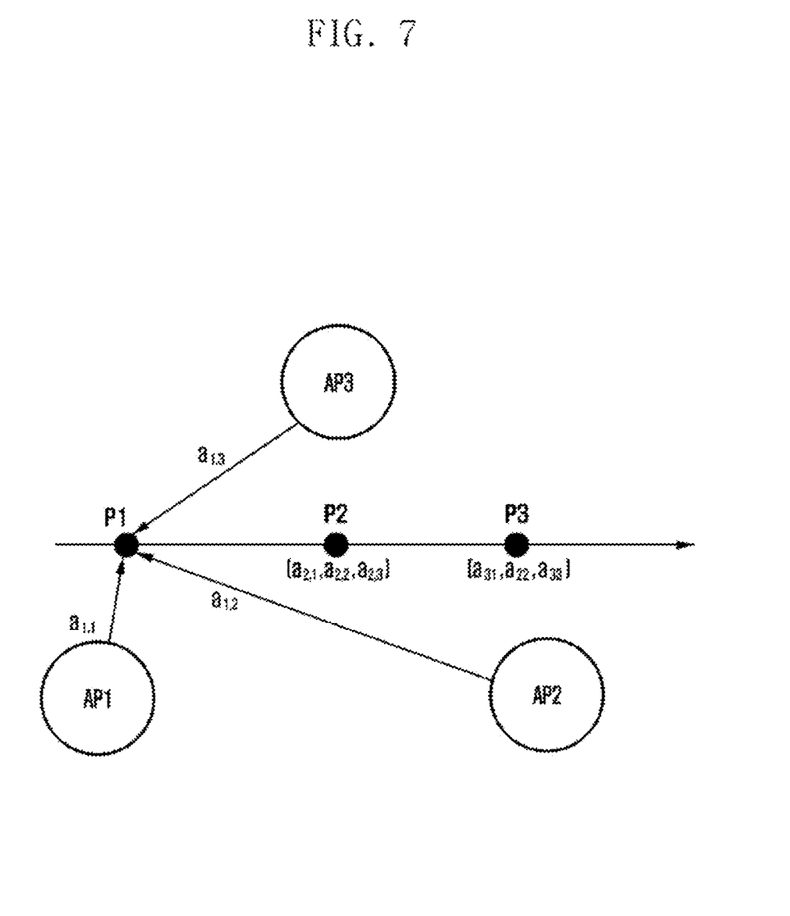
FIG. 7 illustrates an RSSI vector at a specific location according to an embodiment of the present invention.

FIG. 7 illustrates an RSSI vector at a specific location according to an embodiment of the present invention.

With reference to FIGS. 1 to 7, the RSSI signals of plural APs (AP1 to AP3) measured at a first position P1 may be represented by an RSSI vector. For example, the RSSI signal of the first AP (AP1) measured at the first position P1 may be represented by the first RSSI vector of $a_{1,1}$, the RSSI signal of the second AP (AP2) measured at the first position (P1) may be represented by the second RSSI vector of $a_{1,2}$, and the RSSI signal of the third AP (AP3) measured at the first location (P1) may be represented by the third RSSI vector of $a_{1,3}$.

In one embodiment, the first RSSI vector may be generated based on a basic RSSI vector that is generated using a signal received by the first AP (AP1) from the second AP (AP2) or the third AP (AP3). The second RSSI vector may be generated based on a basic RSSI vector that is generated using a signal received by the second AP (AP1) from the first AP (AP1) or the third AP (AP3). The third RSSI vector may be generated based on a basic RSSI vector that is generated using a signal received by the third AP (AP3) from the first AP (AP1) or the second AP (AP2).

Figure 8:
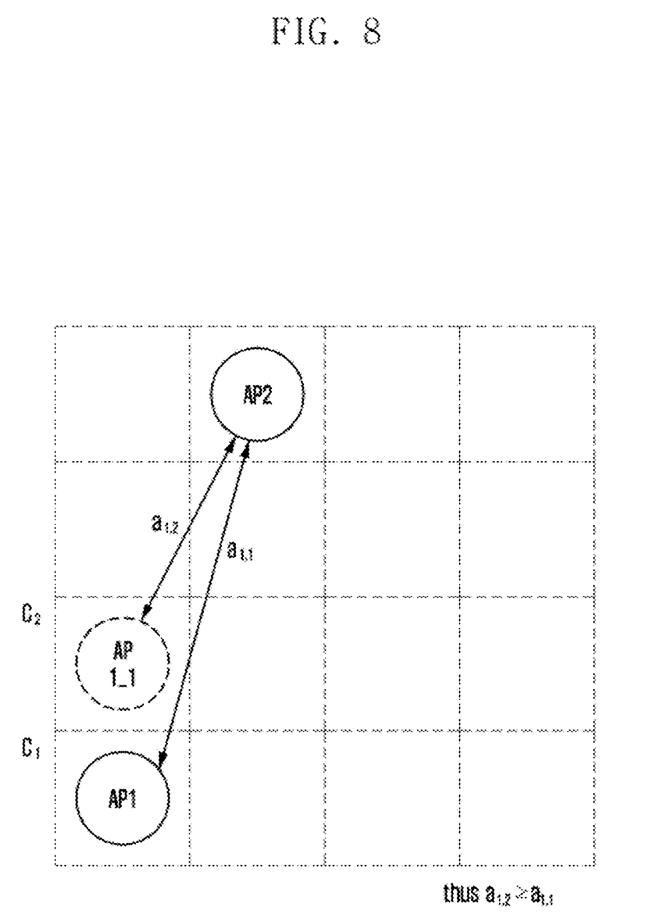
FIG. 8 illustrates generation of an RSSI vector for a sub-region included in a radio map.

FIG. 8 illustrates generation of an RSSI vector for a sub-region included in the radio map.

With reference to FIGS. 1 to 8, the location estimation apparatus may receive the first RSSI signal measured at the first AP (AP1) from the second AP (AP2) and generate a first RSSI vector ($a_{1,1}$) corresponding to the first RSSI signal.

The location estimation apparatus may calculate a path loss exponent based on the distance between the first AP and the second AP and the first RSSI vector, and generate the second RSSI vector ($a_{1,2}$) for the sub-region ($C_2$) in the entire region by adding the offset calculated using the path loss exponent to the first RSSI vector.

The offset may be calculated based on the path loss exponent, the distance between the initial sub-region ($C_1$) and the second AP (AP2), and the distance between the target sub-region ($C_2$) and the second AP (AP2).

Figure 9:
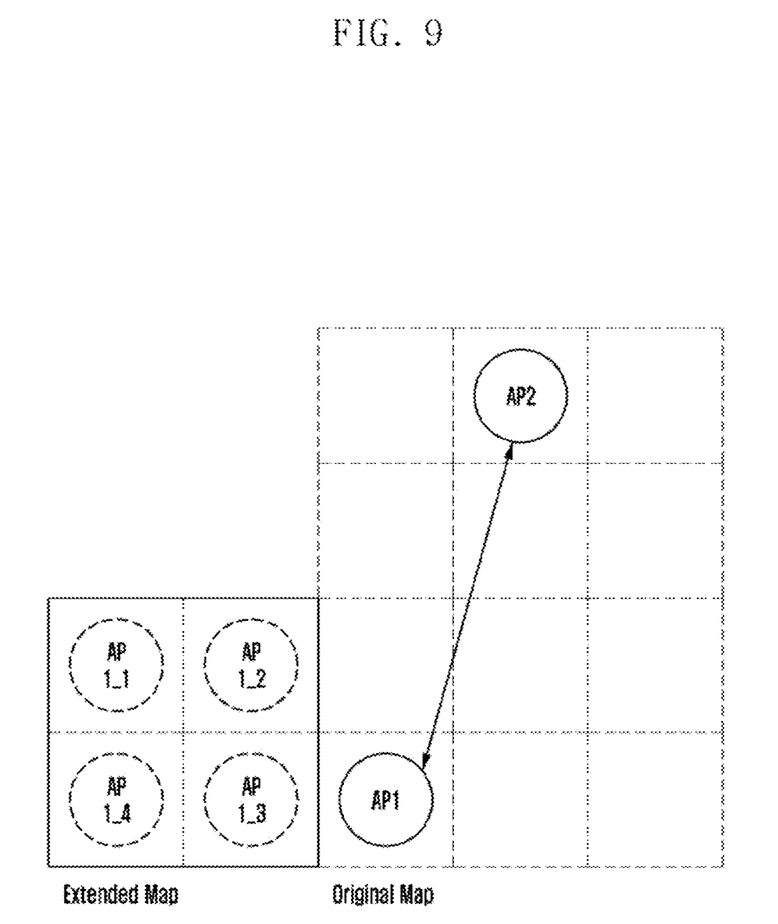
FIG. 9 illustrates extension of the radio map.

FIG. 9 illustrates extension of the radio map.

With reference to FIGS. 1 to 9, the location estimation apparatus may receive the RSSI signal measured at the first AP (AP1) from the second AP (AP2) and generate a basic RSSI vector corresponding to the RSSI signal.

The location estimation apparatus may expand the radio map by generating RSSI vectors for the sub-regions (AP 1_1 to AP 1_4) located in the extended map outside the original map on the basis of the basic RSSI vector.

Figure 10:
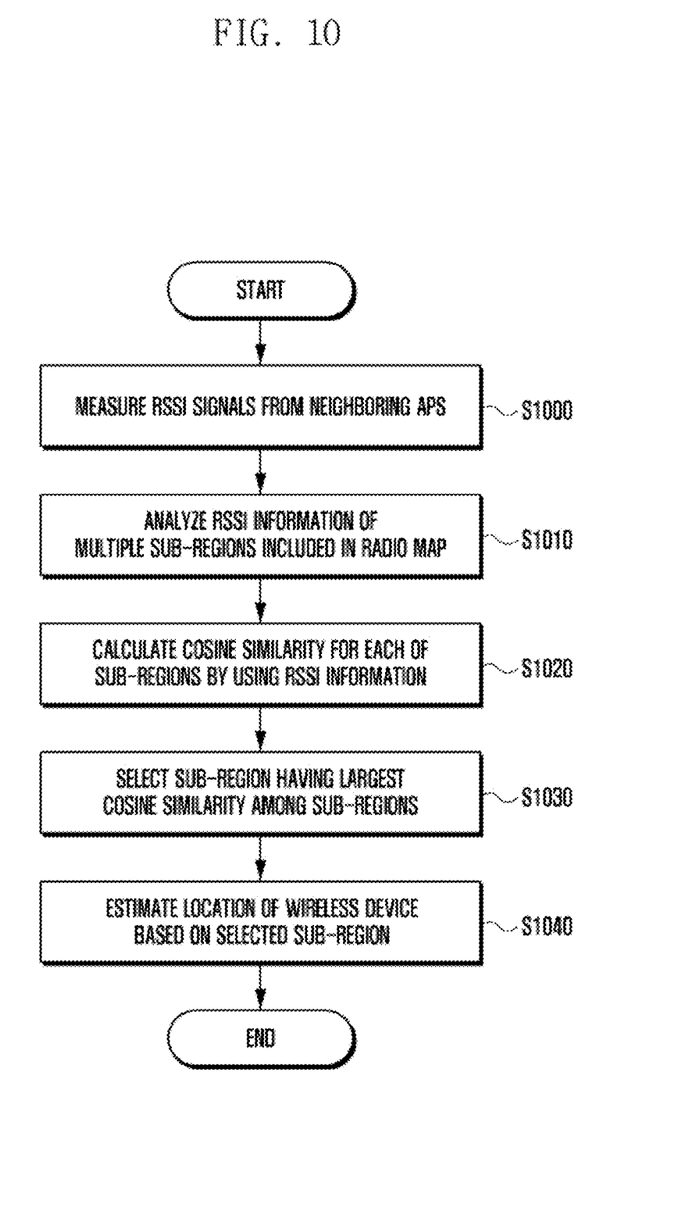
FIG. 10 is a flowchart of a process for the location estimation apparatus to estimate the location of a wireless device according to an embodiment of the present invention.

FIG. 10 is a flowchart of a process for the location estimation apparatus to estimate the location of a wireless device according to an embodiment of the present invention.

With reference to FIGS. 1 to 10, the location estimation apparatus can measure the RSSI signals from neighboring APs (S1000). For example, the location estimation apparatus may receive RSSI signals measured at neighboring APs via a specific AP.

The location estimation apparatus may analyze RSSI information of multiple sub-regions included in the radio map (S1010). The RSSI information may include location information (e.g., (x, y)) for each sub-region, and vector information measured at the adjacent AP for each sub-region.

The location estimation apparatus may calculate the cosine similarity for each of the sub-regions by using the RSSI information (S1020).

The location estimation apparatus may select a sub-region having the largest cosine similarity from among the sub-regions (S1030), and estimate the location of the wireless device based on the selected sub-region (S1040).

Figure 11:
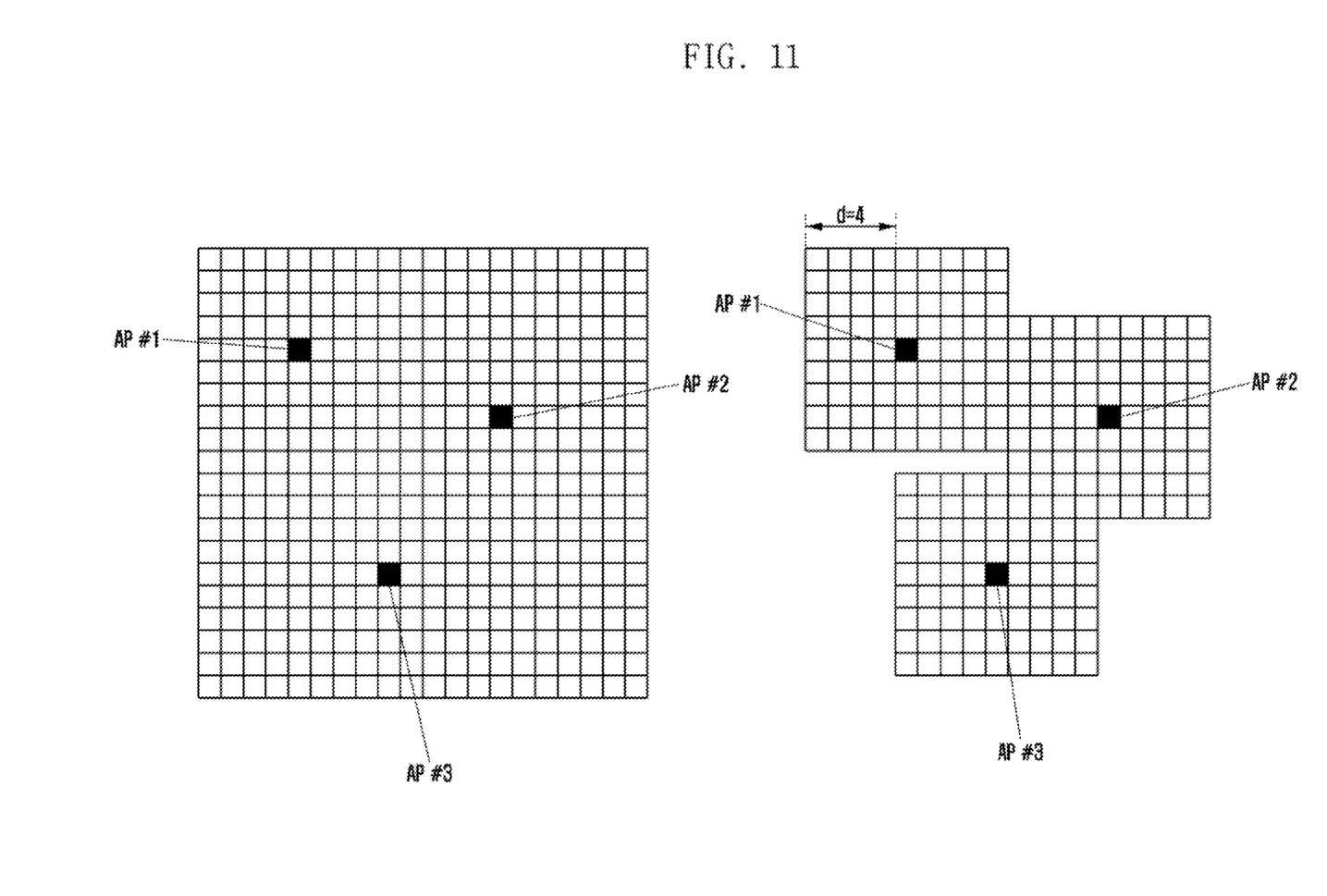
FIG. 11 illustrates selection of sub-regions existing within a preset distance from the AP according to an embodiment of the present invention.

FIG. 11 illustrates selection of sub-regions existing within a preset distance from the AP according to an embodiment of the present invention.

With reference to FIGS. 1 to 11, the location estimation apparatus can arrange each of the first AP (AP#1), the second AP (AP#2), and the third AP (AP#3) in the corresponding sub-region among the plural sub-regions included in the radio map.

In the process of estimating the location of the wireless device, the location estimation apparatus may calculate the cosine similarity only for first sub-regions existing within a preset distance (d=4) from each of the first AP (AP#1), the second AP (AP#2), and the third AP (AP#3), simplifying the location estimation process.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method of operation for a location estimation apparatus communicating with an access point (AP) in a wireless communication system, the method comprising:

receiving a first received signal strength indicator (RSSI) signal measured at a first AP via a second AP, and generating a first RSSI vector corresponding to the first RSSI signal;

calculating a path loss exponent using a distance between the first AP and the second AP and the first RSSI vector, and generating a second RSSI vector for each of multiple sub-regions constituting an entire region based on the path loss exponent; and generating a radio map for the entire region based on the first RSSI vector and the second RSSI vector.

2. The method of claim 1, wherein the location estimation apparatus is one of an AP controller and an AP server for controlling the APs.

3. The method of claim 1, further comprising:
generating a third RSSI vector corresponding to a second RSSI signal measured by a wireless device; and
estimating a location of the wireless device in the radio map based on a cosine similarity between the second RSSI vector and the third RSSI vector.

4. The method of claim 3, wherein estimating the location of the wireless device comprises:
calculating the cosine similarity between the second RSSI vector and the third RSSI vector, and selecting a sub-region having a largest cosine similarity from among the sub-regions; and
estimating that the wireless device is located where the selected sub-region is located in the radio map.

5. The method of claim 4, wherein the cosine similarity is calculated for first sub-regions located within a preset distance from the second AP among the sub-regions.

6. The method of claim 1, wherein generating a second RSSI vector for each sub-region comprises generating the second RSSI vector by adding an offset calculated using Equation 5 to the first RSSI vector, $$x = n\log\frac{d(C_0, AP_i)}{d(C_1, AP_i)} \quad \text{[Equation 5]}$$

where x is the offset, n is the path loss exponent, $C_0$ is an initial sub-region, $C_1$ is a target sub-region, $AP_i$ is the second AP, $d(C_0,AP_i)$ is a distance between the initial sub-region and the second AP, and $d(C_1,AP_i)$ is a distance between the target sub-region and the second AP.

7. The method of claim 1, further comprising:
normalizing the first RSSI vector and storing the normalized first RSSI vector in the radio map; and
normalizing the second RSSI vector and storing the normalized second RSSI vector in the radio map.

8. The method of claim 1, wherein the first AP and the second AP are adjacent to each other, and wherein the first RSSI signal is transmitted from the first AP to the second AP.

9. An apparatus for location estimation capable of communicating with an access point (AP) in a wireless communication system, comprising:
a transceiver unit configured to receive a first received signal strength indicator (RSSI) signal measured at a first AP via a second AP; and
a radio map generator configured to generate a first RSSI vector corresponding to the first RSSI signal, calculate a path loss exponent using a distance between the first AP and the second AP and the first RSSI vector, generate a second RSSI vector for each of multiple sub-regions constituting an entire region based on the path loss exponent, and generate a radio map for an entire region based on the first RSSI vector and the second RSSI vector.

10. The apparatus of claim 9, wherein the apparatus is one of an AP controller and an AP server for controlling the APs.

11. The apparatus of claim 9, further comprising a location estimator configured to generate a third RSSI vector corresponding to a second RSSI signal measured by a wireless device, and estimate a location of the wireless device in the radio map based on a cosine similarity between the second RSSI vector and the third RSSI vector.

12. The apparatus of claim 11, wherein the location estimator is configured to calculate the cosine similarity between the second RSSI vector and the third RSSI vector, select a sub-region having a largest cosine similarity from among the sub-regions, and estimate that the wireless device is located where the selected sub-region is located in the radio map.

13. The apparatus of claim 12, wherein the location estimator is configured to compute the cosine similarity for first sub-regions located within a preset distance from the second AP among the sub-regions.

14. The apparatus of claim 9, wherein the radio map generator is configured to generate the second RSSI vector by adding an offset calculated using Equation 6 to the first RSSI vector, $$x = n\log\frac{d(C_0, AP_i)}{d(C_1, AP_i)} \quad \text{[Equation 6]}$$

where x is the offset, n is the path loss exponent, $C_0$ is a initial sub-region, $C_1$ is a target sub-region, $AP_i$ is the second AP, $d(C_0,AP_i)$ is a distance between the initial sub-region and the second AP, and $d(C_1,AP_i)$ is a distance between the target sub-region and the second AP.

15. The apparatus of claim 9, wherein the radio map generator is configured to normalize the first RSSI vector and store the normalized first RSSI vector in the radio map, and normalize the second RSSI vector and store the normalized second RSSI vector in the radio map.

* * * * *